United States Patent Office 2,959,129
Patented Nov. 8, 1960

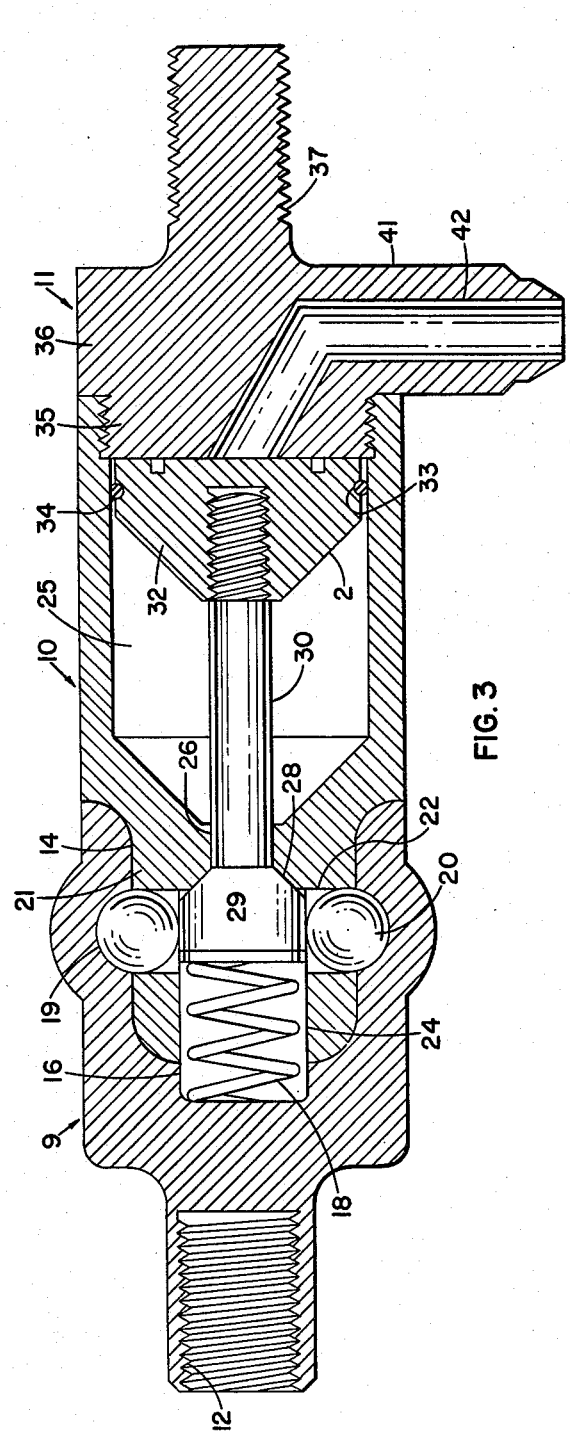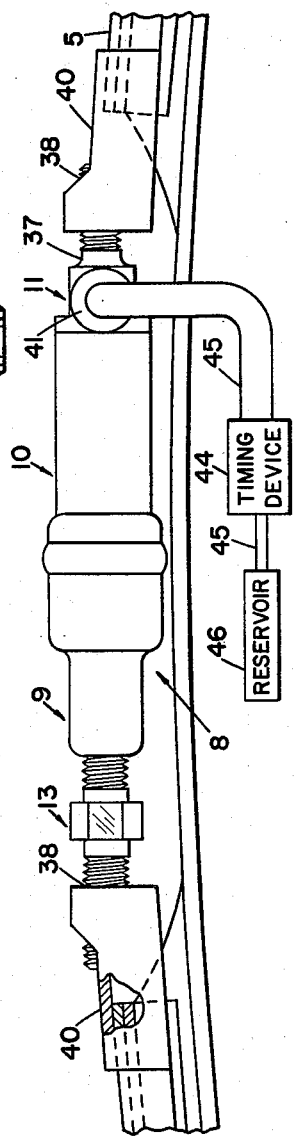

2,959,129

MISSILE-STAGE CONNECTING AND RELEASING DEVICE

Alfred P. Warren, Huntsville, Ala., assignor to the United States of America as represented by the Secretary of the Army Filed Feb. 18, 1959, Ser. No. 794,211

3 Claims. (Cl. 102—92.5)

(Granted under Title 35, U.S. Code (1952), sec. 266)

The invention described herein may be manufactured and used by or for the Government for governmental purposes without the payment of any royalty thereon.

This invention relates to a missile-stage connecting and releasing device. The quick-release connector of this device may be used to provide for quick release of any two members that are connected, such as, for example, a lifting magnet and its cable.

When such a device is used in connecting the stages of a missile it should be capable of quick separation, thus causing the stages to be quickly separated. On the other hand, such a device should be able to withstand a high tensile load without separating and, especially when used in missiles, should be capable of automatic separation.

In view of these facts, a principal object of this invention is to provide a quick release device for holding the stages of a missile together.

Another object of this invention is to provide such a device which will operate under high tensile loads.

A further object is to provide such a device which can be automatically operated.

The foregoing and other objects of this invention will become more fully apparent from the following detailed description and from the accompanying drawings, in which:

Figure 2 is a view taken along line 2—2 of Figure 1.

Figure 3 is a detail, sectional view of connector components 9, 10 and 11 of Figure 2.

Figure 1:
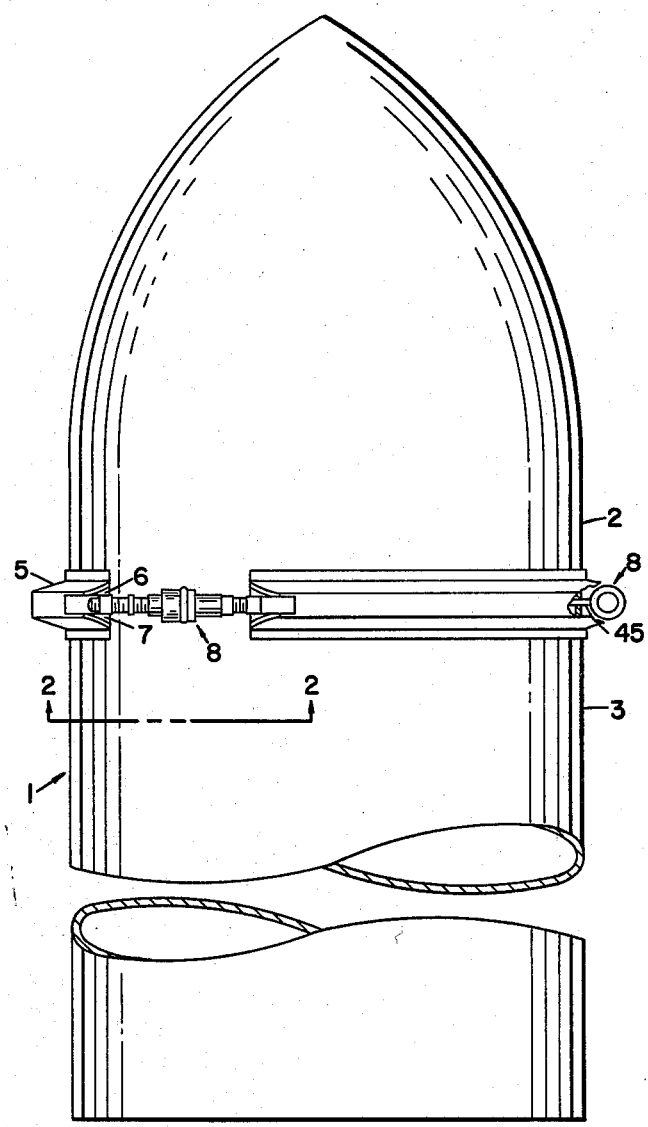
Figure 1 is a view of a missile with the device of this invention in position between two of the missile stages, showing the connecting band in exaggerated size for the purpose of clear explanation.

In the drawings, wherein for the purpose of illustration there is shown a preferred embodiment of the invention, the numeral 1 designates a missile having stages 2 and 3.

Figure 4:
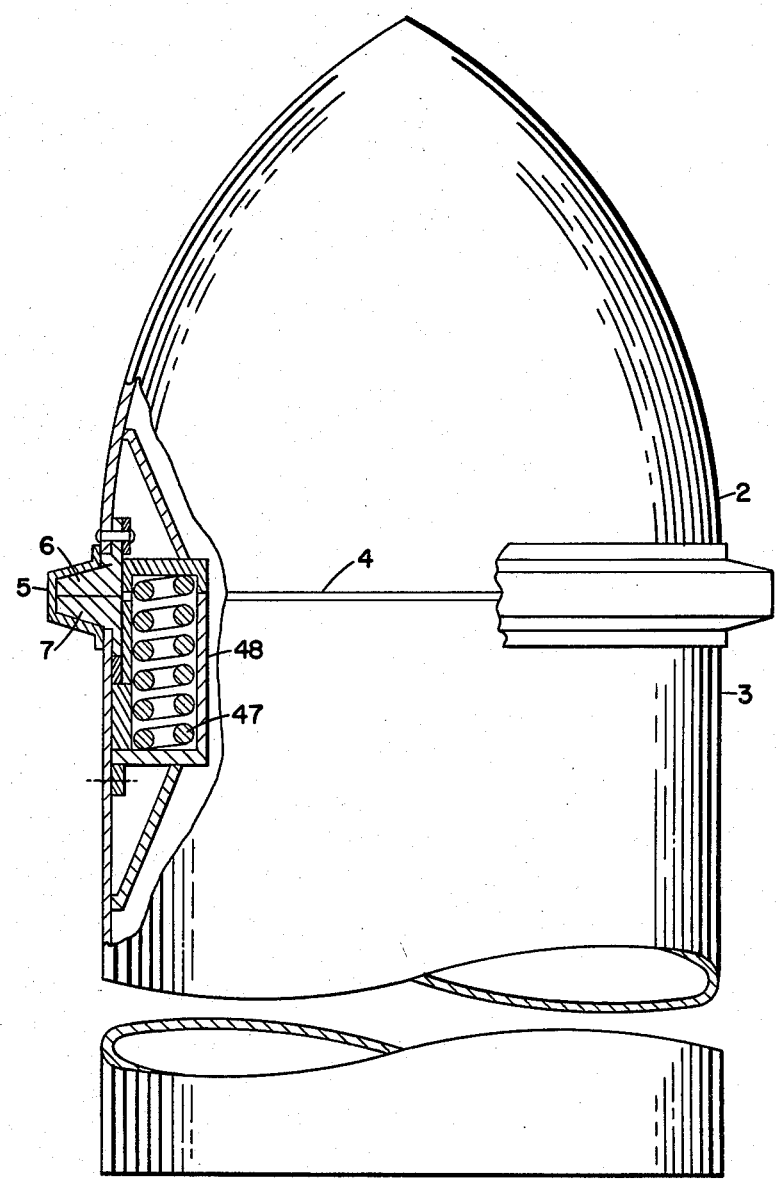
Figure 4 is an elevational view of the missile, with part of the connecting band and missile-separating mechanism in section and with part of the missile body broken away.

Stages 2 and 3 are held together at 4 by a substantially U-shaped band 5. Band 5 is adapted to fit over flanges 6 and 7 (Figure 4) on stages 2 and 3.

Band 5 is divided into three sections which are secured together by three quick release connectors 8, a third connector in Figure 1 being located on the side of the missile that is opposite from the two connectors that are shown in the figure. These three connectors are interchangeable and are comprised of the same components shown in detail in Figure 3.

As shown in Figure 3, each of the connectors is divided into three sections 9, 10 and 11. Section 9 has an internally threaded bore 12 at one end, for receiving a threaded portion of the tension adjusting member 13. The other end contains a large central bore 14, which is joined by a smaller central bore 16, which receives an end of spring 18. Bore 14 has an annular recess 19, which houses the outer portions of locking balls 20, of steel or other metal, when sections 9 and 10 are joined.

The inner portions of these balls then are held in four equally spaced holes 22 in section 10, the holes terminating in central bore 24 in reduced portion 21 of one end of section 10. This bore is equal in size to bore 16, so as to allow spring 18 to move in both bores. The other end of section 10 contains a large central bore 25, which joins a small central bore 26. Bore 26 is connected with bore 24 by a central, frusto-conical recess 28. This recess is adapted to fit enlarged portion 29 of one end of rod 30. The other end of rod 30 is attached to piston 32.

This piston is freely slidable in bore 25. The circumference of the piston contains a recess 33 adapted to receive an O ring 34, which provides a pressure-tight connection between the bore and piston.

Section 11 comprises a reduced end 35 adapted to be secured in a threaded portion of bore 25, so that section 10 abuts middle portion 36. The other end 37 is screw threaded, so as to be received by either of the screw threaded bores 38 in the strap connecting elements 40, which are attached to the six ends of the three sections of band 5. Leg 41 is integral with middle portion 36 of section 11 and contains a passageway 42, formed at an angle so as to connect with bore 25 of section 10, when sections 10 and 11 are joined.

This passageway is connected thru a timing device 44 by a conductor 45, to a reservoir 46, which supplies the pressure for operating piston 32.

The operation of the device is as follows:

The stages of missile body 1 are placed together, so that flanges 6 and 7 abut each other. Spring 47 is placed in housing 48 which is formed in two parts, one attached to each of the stages.

Then the three sections of band 5 are connected by two of the connectors 8, leaving two of the band ends disconnected, so that the band may then be placed in position over flanges 6 and 7. Thereafter, the third connector is put in place, so as to connect the remaining free band ends. Each of the three tension adjusting members 13 now is adjusted, so as to provide the necessary tension for holding the missile stages together.

All the connectors are attached to the pressure system which may supply fluid to operate pistons 32 as explained above. The device will hold the stages of the missile together until the timing device releases the reservoir pressure at the predetermined time of missile-stage separation.

When the pressure thus is released it passes thru conductors 45 to passageway 42 in leg 41 of each of the connectors. Then pressure is exerted on pistons 32 causing the piston to slide in central bores 25.

This movement of piston 32 will actuate rods 30, causing their enlarged portions 29 to slide in small central bores 16. When the enlarged portions move past balls 20, the balls are free to move from their seats in recesses 19, and sections 9 will separate from sections 10.

When section 9 of each connector has separated from section 10, band 5 will separate into three parts.

As these three parts separate from flanges 6 and 7 stages 2 and 3 will be free to separate. Spring tensioning means 47 helps separate the stages by applying pressure between them.

It is to be understood that the forms of the invention, herein shown and described, are to be taken as preferred embodiments, and that various changes in the shape, size and arrangement of parts may be resorted to without departing from the spirit of the invention, or the scope of the subjoined claims.

The following invention is claimed:

1. A quickly releasable assembly comprising: a plurality of elements assembled together; abutting flanges fixed to said elements; a plurality of parti-annular band parts, each having an arcuate recess that encloses said flanges in assembled position; connecting means for fastening together and quickly releasing said band parts; said connecting means having a first section, provided with a screwthreaded recess in one end of the section, a central recess in the other end of the section, a second recess smaller in size than and connecting with said central recess, an annular recess opening into said central recess at substantially the center point of said central recess, a spring having one end engaging the bottom of said second recess; said connecting means further having a second, middle section, which has one end smaller than its other end projecting into said central recess, a plurality of holes radially located in and spaced around the circumference of said smaller end of said second section, said holes being in line with said annular recess, said second section further having a centrally located recess equal in size to said second recess in said first section, and having one of its ends joining said second recess and the other of its ends intersecting said plurality of holes, said second section further having a frusto-conical recess at the bottom of said centrally located recess, adjacent said holes, and a piston chamber at the end of said second section opposite from said first section, said second section having a bore joining said chamber and frusto-conical recess, a plurality of locking balls housed in said plurality of holes, a rod having one end extending thru said bore, and a portion within said centrally located recess which is larger in diameter than said bore, and is in engagement with said spring, said rod portion having a frusto-conical surface seated against said frusto-conical recess, and having a portion retaining said balls in locking relation with said annular recess, a piston secured to the smaller end of said rod, said piston being provided with a recess around its circumference, an O-ring seal partially enclosed in said piston recess; a third section, having a screwthreaded end secured in pressure-tight engagement with said second section, and a passageway for the supply of pressurized motive fluid, and screwthreaded means for attachment to one of said band parts; a second screwthreaded means for connecting said band parts and for drawing said band parts together; means for supplying pressurized fluid to said passageway and piston; and timing means for actuating said pressure-fluid supplying means at a predetermined time, whereby fluid pressure on said piston moves the piston and said rod to release said balls from said locking relation, and said elements are free to separate; and means for assisting separation of said elements.

2. An assembly as set forth in claim 1, in which said means for assisting separation of said elements comprises a housing formed in two parts, one part integral with one of said elements, and the other part integral with the second of said elements, and a compressed spring housed, when said elements are joined, partially in one of said parts and partially in the other part.

3. A device as set forth in claim 1, in which said means for supplying pressurized fluid comprises a pressurized-fluid reservoir, a fluid conduit connecting said reservoir and timing means, a second conduit having one end connected to said timing means and the other end connected to said passageway.

References Cited in the file of this patent
UNITED STATES PATENTS

| | | |
|---|---|---|
| 2,604,043 | Frisch et al. | July 22, 1952 |
| 2,750,890 | Leonard | June 19, 1956 |
| 2,809,584 | Smith | Oct. 15, 1957 |
| 2,850,976 | Seifert | Sept. 9, 1958 |
| 2,926,609 | Van Goey | Mar. 1, 1960 |

FOREIGN PATENTS

| | | |
|---|---|---|
| 979,155 | France | Dec. 6, 1950 |